United States Patent
Ochi et al.

(10) Patent No.: US 8,516,511 B2
(45) Date of Patent: Aug. 20, 2013

(54) OPTICAL PICKUP AND DISC DRIVE USING OPTICAL PICKUP

(75) Inventors: Manabu Ochi, Hitachinaka (JP); Junichi Senga, Yokohama (JP); Takehiro Hayama, Fujisawa (JP)

(73) Assignee: Hitachi Media Electronics Co., Ltd, Iwate (JP)

( * ) Notice: Subject to any disclaimer, the term of this patent is extended or adjusted under 35 U.S.C. 154(b) by 0 days.

(21) Appl. No.: 13/434,982

(22) Filed: Mar. 30, 2012

(65) Prior Publication Data

US 2013/0010582 A1 Jan. 10, 2013

(30) Foreign Application Priority Data

Jul. 5, 2011 (JP) .................................. 2011-149462

(51) Int. Cl.
*G11B 7/12* (2006.01)
(52) U.S. Cl.
USPC ......................................................... 720/648
(58) Field of Classification Search
USPC ......................................................... 720/648
See application file for complete search history.

(56) References Cited

U.S. PATENT DOCUMENTS 6,034,940 A * 3/2000 Lee ................................ 720/685
2007/0169135 A1* 7/2007 Omori et al. ................... 720/658

FOREIGN PATENT DOCUMENTS

JP 2008-077699 A 4/2008

* cited by examiner

*Primary Examiner* — Mark Blouin
(74) *Attorney, Agent, or Firm* — Mattingly & Malur, PC

(57) ABSTRACT

An optical pickup having a case made of a resin material reinforced with glass fiber, inorganic filler or the like with polyphenylene sulfide as a base material, and a metal plate formed of a material having a linear expansion coefficient within a range of a linear expansion coefficient of the case in a direction between bearings when a fiber orientation of the case is along the direction between the bearings or random. The metal plate has two rising members bended to the case side at both ends in the direction between the bearings. Two walls of the outer hull of an opening of the case at both ends in the direction between the bearings and the two rising members of the metal plate are alternately opposed, and the opposed walls of the case and the rising members of the metal plate are fixed using adhesives.

12 Claims, 5 Drawing Sheets

OPTICAL PICKUP AND DISC DRIVE USING OPTICAL PICKUP

CLAIM OF PRIORITY

The present application claims priority from Japanese Patent application serial No. 2011-149462, filed on Jul. 5, 2011, the content of which is hereby incorporated by reference into this application.

TECHNICAL FIELD

The present invention relates to an optical pickup to read information recorded on a recording surface of a disc-shaped information recording medium or write information on the recording surface, and a disc drive using the optical pickup.

BACKGROUND ART

An optical pickup is a device to read/write information using a spot formed by gathering laser light emitted from a laser diode (LD) with an object lens on a recording surface of a disc.

A general optical pickup mainly has three elements, i.e., an optical system, an object lens actuator and a circuit board. The optical system focuses the laser light emitted from the laser diode, and reads information on a disc utilizing the reflection light from the disc or writes information on a recording layer of the disc. The object lens actuator drives the object lens in a focusing direction and a tracking direction to align a focal point of the object lens on a track on the disc. The circuit board electrically connects the object lens actuator and the optical system with an external controller. These parts are fixed in a case (housing).

As the material of the case, a resin material, having molding workability corresponding to a complicated shape, appropriate to mass-production at a lower cost in comparison with a metal, is mainly used. In an optical pickup having a case made of a resin material, as the thermal conductivity of the case itself is low, a metal plate having high thermal conductivity is provided on the top panel side or bottom panel side of the case, and the metal plate is thermally connected with the laser diode. With this arrangement, the cooling capability for the laser diode is ensured.

In the optical pickup in which the metal plate is fixed to the case made of a resin material in this manner, when an environmental temperature has changed, the case may be distorted by thermal stress due to the difference of expansion and contraction amount between the parts. When the case is distorted, the optical parts attached to the case is inclined in accordance with the distortion of the case. The inclination of the optical parts may become a factor to change a focal distance and/or focal position and disturb stable read/write operations. Accordingly, it is necessary to suppress the distortion of the case.

Regarding the problem of the distortion of the case in accordance with change of environmental temperature, known is an optical pickup as disclosed in PTL1 (Japanese Patent Laid-open No. 2008-77699) where a metal plate is screw-fixed to a case in the vicinity of one of two bearings of the case and is fitted in between engagement claws of the case in the vicinity of the other bearing.

According to the above art, it is possible to swing the metal plate to some degree relatively to the case, with the screw as a center, and displace it in the bearing direction. The distortion of the case in accordance with temperature change can be suppressed. As a result, the position of the optical part provided in the case are maintained constant, and it is possible to perform stable read/write operation.

[Citation List]
[Patent Literature]
[PTL 1] Japanese Patent Laid-open No. 2008-77699 (claim 1, FIG. 5)

SUMMARY OF INVENTION

Technical Problem

A general optical pickup case is usually in a box shape and usually has two bearings provided at both ends in a longitudinal direction of the case to move the optical pickup in a radial direction of a disc through a guide shaft and an opening on the top panel side or the bottom panel side for attachment of the optical parts.

When impact load in the focusing direction acts on the bearings of this case, the case is distorted in a direction between the bearings as a longitudinal direction and the opening is widened or narrowed. Regarding such deformation, in the fixing between the case and the metal plate such that the metal plate is screw-fixed to the case in the vicinity of one end in the lengthwise direction and engaged between engagement claws of the case in the vicinity of the other end, as in the case of the above-described conventional technique, as it is impossible to apply any force in the longitudinal direction to the case from the metal place, the metal plate cannot be a reinforcing member to suppress the deformation of the case, i.e., the case is distorted and the opening is widened/narrowed. Accordingly, in the above-described conventional technique, in the optical pickup using a case of a resin material having low elasticity, sufficient rigidity cannot be ensured. There is a probability of deformation of the case by impact load to cause dropout of the parts fixed to the case or damage to the case.

The present invention has an object to provide an optical pickup in which a cooling capability for an electronic part is ensured, deformation of a case with respect to impact load is suppressed and dropout of parts and/or damage to the case is prevented, while distortion of the case in accordance with change of environmental temperature is suppressed.

Solution to Problem

The foregoing object is attained by constructing an optical pickup as follows. The optical pickup has an optical system to guide laser light emitted from a laser diode to a predetermined position on a disc, a photo-detector to convert reflection light from the disc into an electric signal, a case mounting the photo-detector and the optical system, an opening provided in the case for attachment of the optical system, and a metal plate provided to close the opening. The case is made of a resin material. The metal plate has two rising members bended to the case side at both ends in the direction between the bearings. In an outer hull of the opening of the case, two walls at both ends in the direction between the bearings and the two rising members of the metal plate are alternately opposed, and the opposed walls of the case and the rising members of the metal plate are fixed respectively with adhesives.

Further, it is preferable that the metal plate is formed of a material having a linear expansion coefficient within a range of a linear expansion coefficient of the case in a direction between bearings.

Further, it is preferable that the case is made of polyphenylene sulfide reinforced with glass fiber and/or mineral filler.

Further, it is preferable that the metal plate is formed of a material having a linear expansion coefficient within a range of a linear expansion coefficient of the case in the direction between the bearings when a fiber orientation of the case is along the direction between the bearings or random.

Further, it is preferable that an opening is provided at the root of one side of the two rising members. At the one side, a surface, from which a normal vector extends toward the inside of the optical pickup, of the rising member is fixed to the wall of the case with the adhesives.

Advantageous Effects of Invention

According to the present invention, it is possible to provide an optical pickup in which a cooling capability for an electronic part is ensured, deformation of the case with respect to impact load is suppressed and dropout of parts and/or damage to the case is prevented, while distortion of a case in accordance with change of environmental temperature is suppressed.

DESCRIPTION OF EMBODIMENTS

Hereinbelow, preferred embodiments of the present invention will now be described in accordance with the accompanying drawings.

[Embodiment 1]

Prior to the explanation of the embodiments of the present invention, the structure of a general optical pickup will be described.

Figure 1:
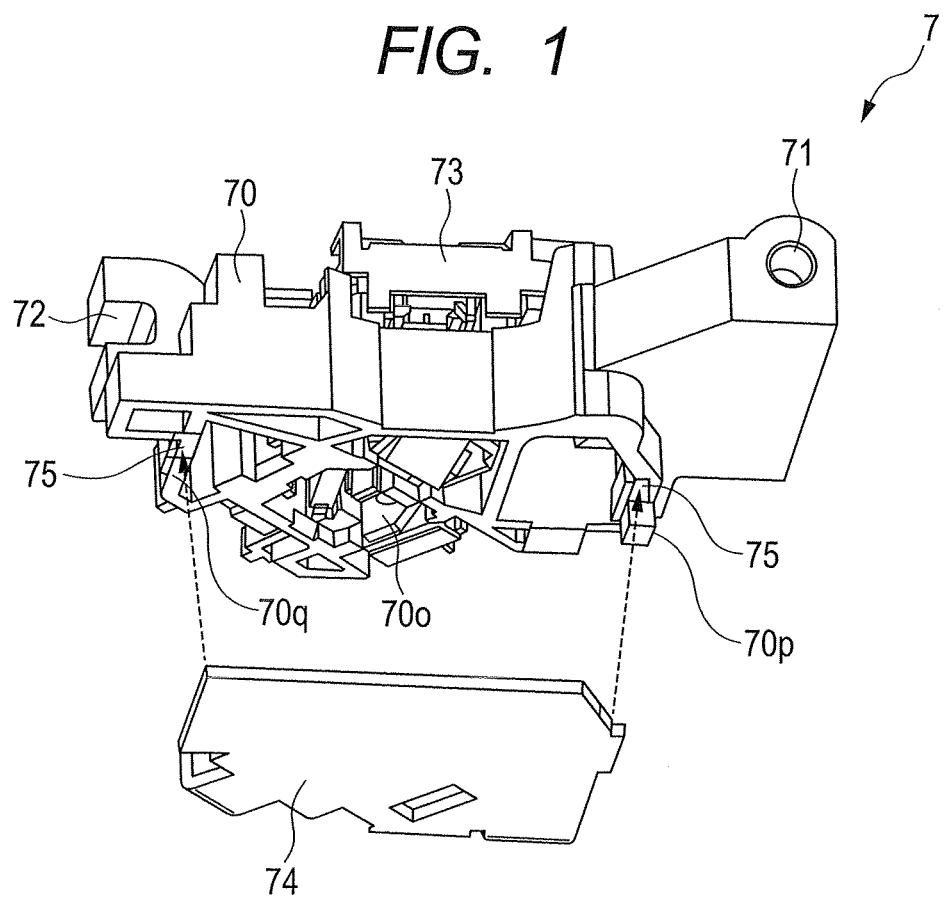
FIG. 1 is an exploded perspective diagram of a general optical pickup.

FIG. 1 is an exploded perspective diagram of a general optical pickup.

Figure 2:
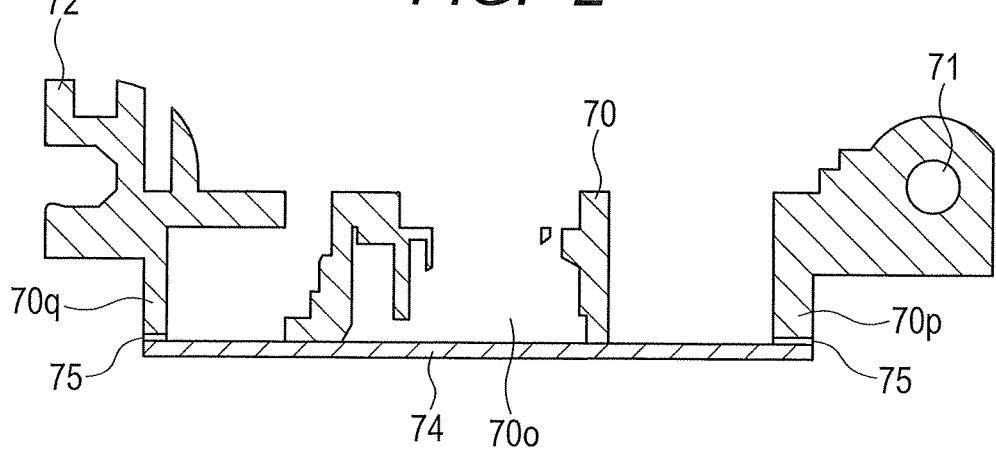
FIG. 2 is a partial cross-sectional diagram of the general optical pickup.

FIG. 2 is a cross-sectional diagram showing positional relation between a case and a metal plate in the general optical pickup.

An optical pickup 7 is a device to write/read information on/from a disc. In FIG. 1, the optical pickup 7 mainly has three elements, i.e., an object lens actuator 73, an optical system and a circuit board (not shown). The optical system has a laser diode as a light source, an optical part to focus laser light from the laser diode on a recording surface of the disc or to generate/detect a control error signal, a photo-detector to convert variation of reflection light from the disc into an electric signal, and the like. The object lens actuator 73 drives an object lens in a focusing direction and a tracking direction, to bring a focal point of the object lens on a track of the disc. The circuit board electrically connects the object lens actuator 73 and the optical system with an external controller. These parts are attached to a case (housing) 70 forming an outer hull of the optical pickup 7.

The case 70 has a box shape with an opening 70o for attachment of the optical system inside. Two bearings 71 and 72 are provided at both ends of the case 70 in its lengthwise direction to move the optical pickup 7 through a guide shaft in a radial direction of the disc.

As the material of the case 70, polyphenylene sulfide reinforced with glass fiber and/or mineral filler, is mainly used since it has molding workability corresponding to a complicated shape of the case and it is appropriate to mass production at a lower cost in comparison with a metal.

In this manner, in the optical pickup 7 in which the case 70 is made of a resin material, as the thermal conductivity of the case 70 itself is low, a metal plate 74 having high thermal conductivity is provided oppositely to the opening 70o of the case 70.

In FIG. 2, the metal plate 74 is attached via adhesives 75 to end surfaces of walls 70p and 70q. The walls 70p and 70q are parts of the outer hull of the opening 70o of the case 70, and are in a direction between the bearings 71 and 72 at both ends of the case. That is, a flat surface of the metal plate 74 is fixed to the end surfaces of the walls 70p and 70q. Note that the direction between the bearings is the same as the longitudinal direction of the case.

In this structure, even in an optical pickup using a case formed of a resin material with low thermal conductivity, the heat from the electronic part is transmitted to the metal plate 74, and high cooling performance can be ensured.

However, even the optical pickup having this structure has a following problem.

That is, when impact load in the focusing direction acts on the bearings of the case 70, deformation of the case 70 occurs, i.e., the case 70 is distorted in a direction between the bearings 71 and 72 as the lengthwise direction of the case and the opening 70o is widened/narrowed. Regarding such deformation, in the general structure where the metal plate is fixed as described above, as the flexural rigidity of the metal plate 74 is low, it is impossible to apply a force in the lengthwise direction on the case 70. Accordingly, the metal plate 74 cannot be a reinforcing member to suppress the deformation, i.e., the case 70 is distorted and the opening is widened/narrowed.

Accordingly, in the above-described general structure, in the optical pickup 7 using the case 70 of a resin material with low elasticity, sufficient rigidity cannot be ensured. There is a probability of deformation of the case 70 by impact load to cause dropout of parts fixed to the case 70 or damage to the case 70.

Then the inventors of the present invention have studied various metal plates to absorb deformation of the case due to heat, and as a result, obtained embodiments as follows.

Hereinbelow, an embodiment 1 of the present invention will be described in accordance with the drawings.

Figure 3:
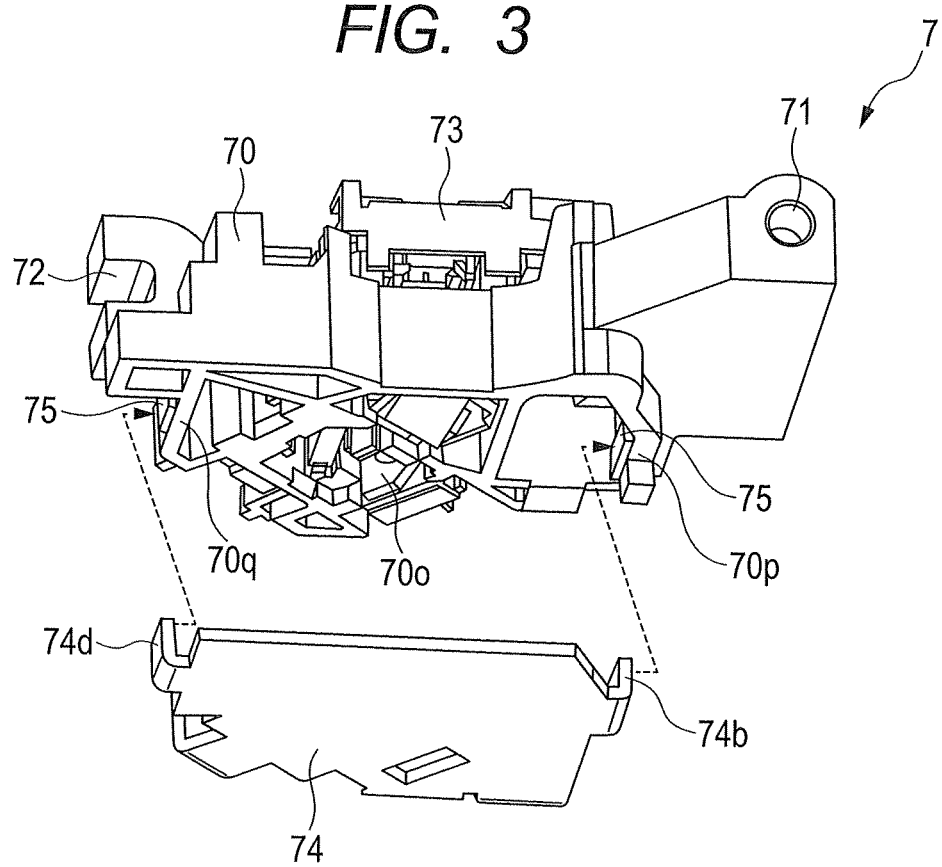
FIG. 3 is an exploded perspective diagram of an optical pickup according to an embodiment of the present invention.

FIG. 3 is an exploded perspective diagram of the optical pickup 7 according to an embodiment 1 of the present invention.

Figure 4:
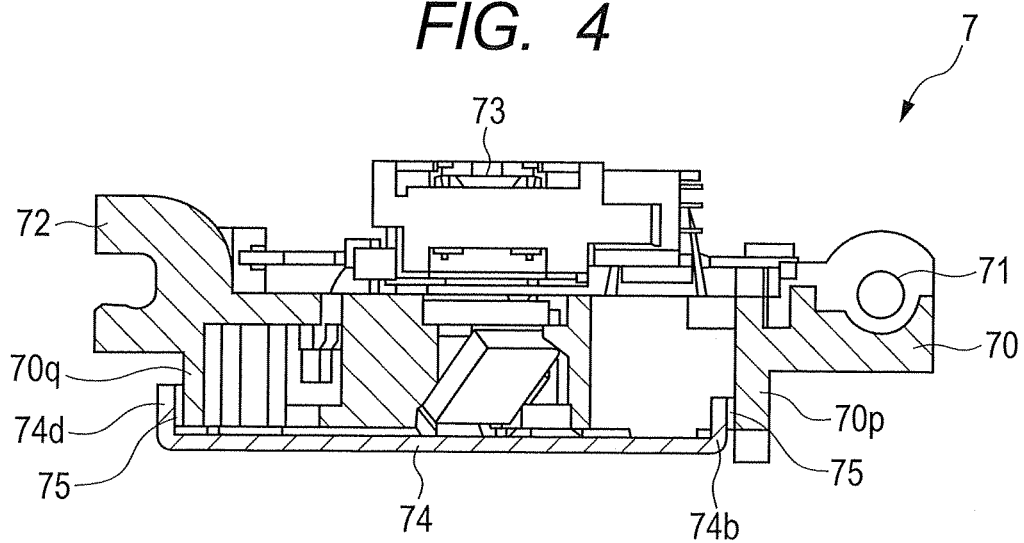
FIG. 4 is a partial cross-sectional diagram of the optical pickup according to the embodiment of the present invention.

FIG. 4 is a partial cross-sectional diagram of the optical pickup 7 according to the embodiment 1 of the present invention.

Note that as other constituent elements than the metal plate 74 described in FIGS. 3 and 4 are the same as those described in FIGS. 1 and 2, detailed explanations of the elements will be omitted.

In FIGS. 3 and 4, as described in FIGS. 1 and 2, in the optical pickup 7 using the case 70 of a resin material, as the thermal conductivity of the case 70 itself is low, the metal plate 74 having high thermal conductivity is provided oppositely to the opening 70o of the case 70. As the metal plate 74 and the laser diode are thermally connected, the cooling performance for the laser diode is ensured. Further, in the pickup 7 using the case 70 of a resin material, the material characteristic of the case 70 has high correlation to fiber orientation.

Accordingly, the fiber orientation of the case 70 is along the direction between the bearings where the rigidity of the optical pickup 7 is the lowest or random so as to improve the elasticity and strength of the case 70 in the direction between the bearings.

Note that when the fiber orientation of the case 70 is along the direction between the bearings, the linear expansion coefficient of the case 70 in the direction between the bearings is about 15 to 19 ppm/K approximately the same as that of austenitic stainless steel or copper alloy. When the fiber orientation of the case 70 is random, the linear expansion coefficient of the case 70 in the direction between the bearings is about 20 to 24 ppm/K approximately the same as that of aluminum alloy.

Next, the characteristic features of the present embodiment will be described using FIG. 5.

Figure 5:
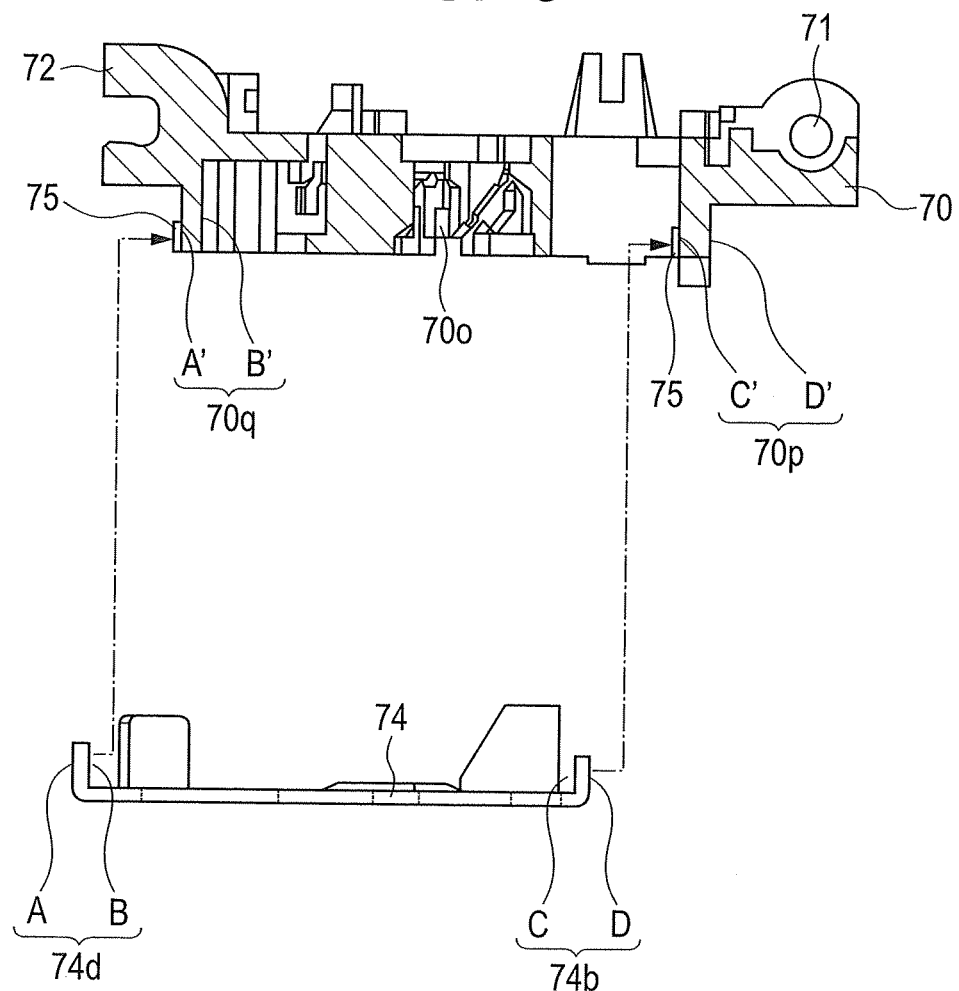
FIG. 5 is an exploded cross-sectional diagram showing the position for attachment between a metal plate and a case according to the embodiment of the present invention.

In FIG. 5, as the first characteristic feature of the present embodiment, the metal plate 74 has a linear expansion coefficient within the range of a linear expansion coefficient of the case 70 in the direction between the bearings when the fiber orientation of the case 70 is along the direction between the bearings or random. In other words, the linear expansion coefficient of the metal plate is substantially the same as the linear expansion coefficient of the case in the direction between the bearings.

As the second characteristic feature, the both ends of the metal plate 74 provided oppositely to the opening 70o of the case 70 in the direction between the bearings are bended to the case 70 side, thus rising members 74b and 74d are provided, and the case 70 and the metal plate 74 are fixed such that walls 70p and 70q of the case 70 and the rising members 74b and 74d of the metal plate 74 are alternately opposed. The walls 70p and 70q are parts of the outer hull of the opening 70o of the case 70 at both ends in the direction between the bearings. In other words, the walls and the rising member are alternately positioned in the direction between the bearings as in the order of the walls 70p, the rising members 74b, the wall 70q and the rising member 74d. More specifically, at one end in the direction between the bearings, the outside of the rising member and the inside of the wall (the outer hull) are faced each other, and at the other end, the inside of the rising member and the outside of the wall (the outer hull) are faced each other. Further, two pairs of the wall of the case and the rising member of the metal plate facing each other, a pair of the wall 70p and the rising member 74d and a pair of the wall 70q and the rising member 74d, are respectively fixed with adhesives 75.

A particular structure showing the first characteristic feature is as follows.

When the fiber orientation of the case 70 in the direction between the bearings is along the direction between the bearings, the metal plate 74 is formed of austenitic stainless steel or copper alloy having a liner expansion coefficient approximately corresponding to the linear expansion coefficient of the case 70 in the direction between the bearings. When the fiber orientation of the case 70 is random, the metal plate 74 is formed of aluminum alloy. Note that the linear expansion coefficient of the case 70 in the direction between the bearings is easily obtained by measuring the expansion and contraction amount in the direction between the bearings when the environmental temperature is changed without cramping the case 70 so that the case is freely expanded and contracted, and dividing the measured value by the size of the case in the direction between the bearings at the normal temperature and the temperature difference.

In the second characteristic feature, the fixing positions on the metal plate 74 side are a surface B where a normal vector of the rising member 74d extends toward the inside of the optical pickup 7 and a surface D where a normal vector of the rising member 74b extends toward the outside of the optical pickup 7. The fixing positions on the case 70 side are a surface A' where a normal vector of the wall 70q extends toward the outside of the optical pickup 7 and a surface C' where a normal vector of the wall 70p extends toward the inside of the optical pickup 7.

First, an advantage of suppression of the distortion of the case 70 in accordance with change of the environmental temperature, according to the present embodiment, will be described using FIG. 6.

Figure 6:
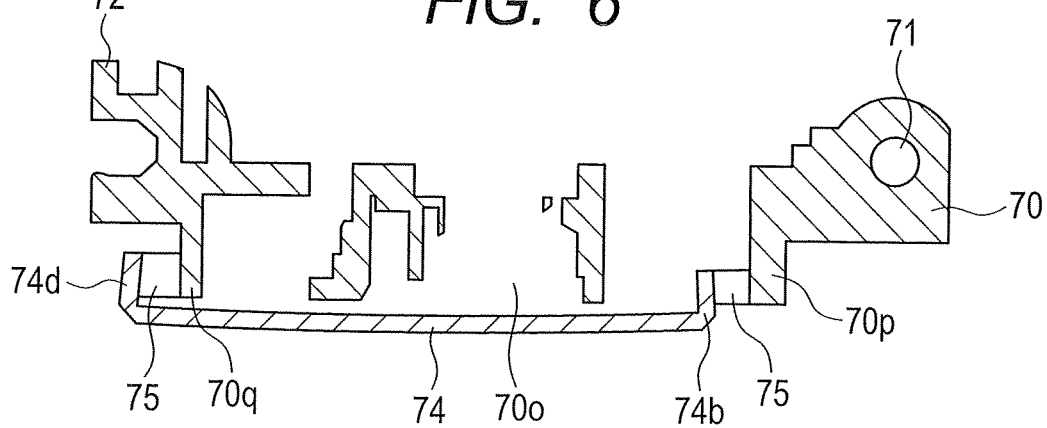
FIG. 6 is a cross-sectional diagram showing deformation of the case, the metal plate and adhesives according to the embodiment of the present invention.

FIG. 6 is a cross-sectional diagram showing deformation of the case 70, the metal plate 74 and the adhesives 75 in a high-temperature environment according to the embodiment 1 of the present invention.

In FIG. 6, by the first characteristic feature of the present embodiment, it is possible to reduce the difference of expansion and contraction amount between the case 70 and the metal plate 74 when the environmental temperature has changed. Further, even when the environmental temperature has changed, by the second characteristic feature of the present embodiment, as the wall 70p and the rising member 74b and the wall 70q and the rising member 74d move away or approach each other by the expansion and contraction amount of the adhesives 75 respectively, and the case 70 and the metal plate 74 merely displace relatively, it is possible to reduce the thermal stress which occurs in the case 70. Accordingly, even when the environmental temperature has changed, the distortion of the case 70 can be suppressed.

Next, the advantage of suppression of the deformation of the case 70 with respect to the impact load according to the present embodiment will be described using FIG. 7.

Figure 7:
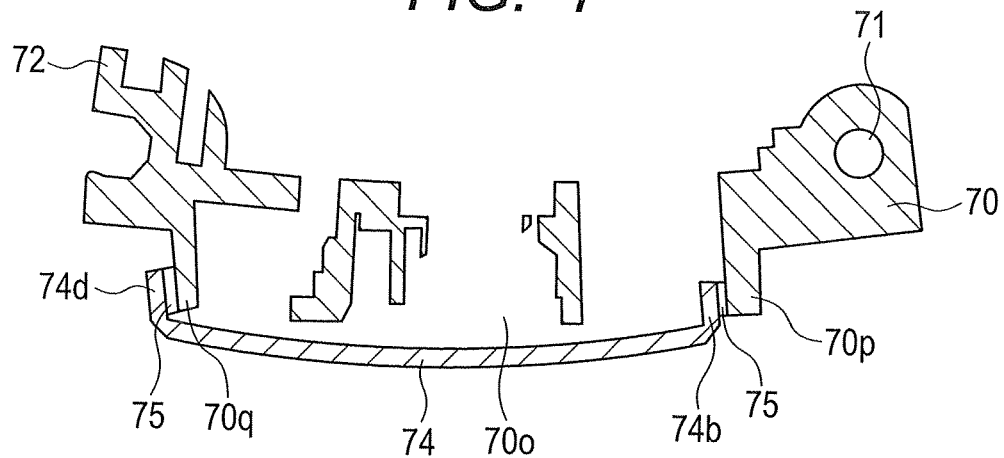
FIG. 7 is a cross-sectional diagram showing deformation of the case, the metal plate and the adhesives upon application of impulse acceleration in a focusing direction on bearings, according to the embodiment of the present invention.

FIG. 7 is a cross-sectional diagram showing the deformation of the case 70, the metal plate 74 and the adhesives 75 upon application of impulse acceleration in the focusing direction (downward direction in the drawing) on the bearings 71 and 72.

In FIG. 7, by the second characteristic feature of the present embodiment, when impact load acts on the bearings, the case 70 is distorted in the direction between the bearings, and the interval between the walls 70p and 70q of the outer hull of the opening 70o is to be widened. On the other hand, the metal plate 74 is distorted such that the rising members 74b and 74d provided at both ends approach each other. That is, the metal plate 74 works as a reinforcing plate to suppress the deformation of the case 70. Accordingly, even in the case of the optical pickup 7 using the case 70 formed of a resin material having low elasticity, it is possible to ensure sufficient rigidity and prevent dropout of parts and/or damage to the case 70.

In other words, when an impact in the focusing direction is applied to a part of the case 70, especially the bearings 71 and 72, due to fall or the like, the opening 70o of the case 70 is deformed in a direction to be widened as shown in FIG. 7.

However, the metal plate 74 is deformed in a direction to cause the rising members 74b and 74d to approach each other as shown in FIG. 7. In this manner, the deformation of the case and the metal plate is mutually suppressed, and it is possible to prevent damage to the case 70.

Note that in the present embodiment, the opening 70o of the case 70 is provided on the bottom surface side, however, similar advantage is obtained when the opening 70o is provided on the top plate side of the case 70 by providing the metal plate 74 oppositely to the opening 70o of the case 70. Further, in the present embodiment, regarding the fixing positions between the case 70 and the metal plate 74, the surfaces B and D as the fixing positions on the metal plate 74 side and the surfaces A' and C' as the fixing positions on the case 70 side are given. However, similar advantage is obtained when the surfaces A and C as the fixing positions on the metal plate 74 side and the surfaces B' and D' as the fixing positions on the case 70 side are given.

[Embodiment 2]

Figure 8:
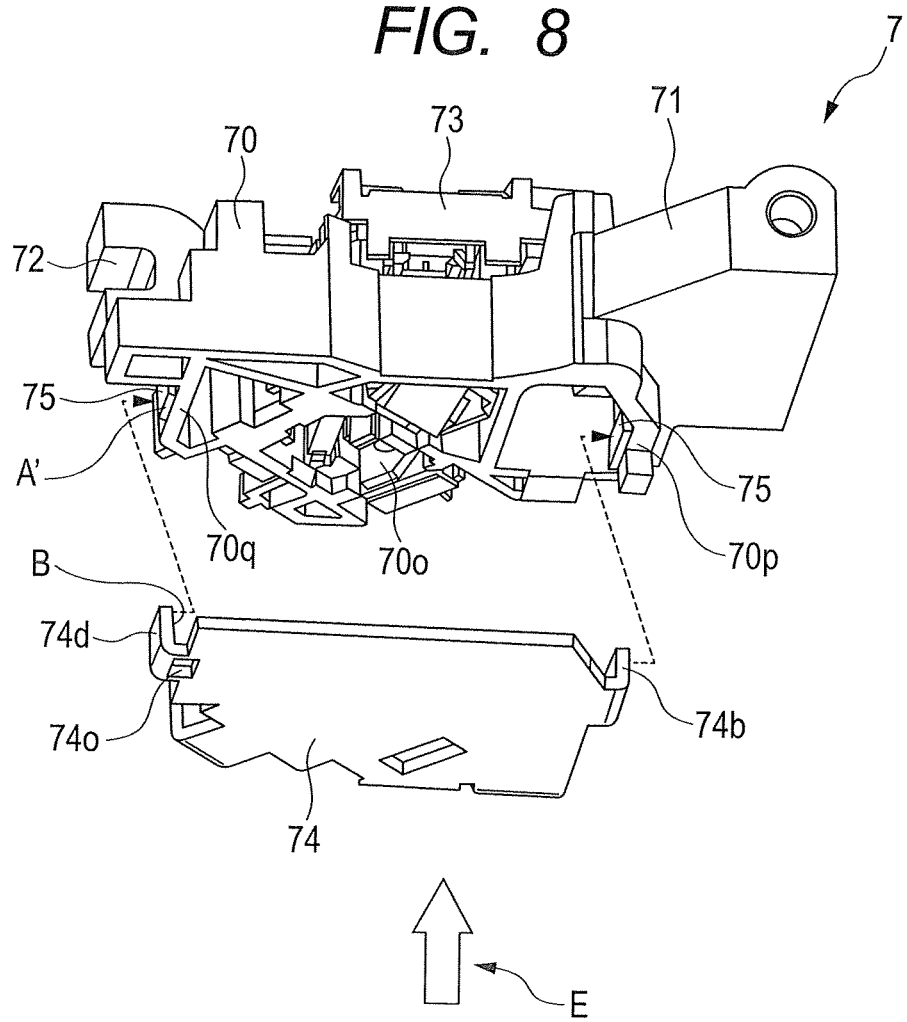
FIG. 8 is an exploded perspective diagram of the optical pickup according to another embodiment of the present invention.

FIG. 8 is an exploded perspective diagram of the optical pickup according to an embodiment 2 of the present invention.

In FIG. 8, in the present embodiment, an opening 74o is provided at the root of the rising member 74b in the two rising members 74b and 74d of the metal plate 74. The rising member 74b is fixed to the surface A' of the wall 70q of the case with the adhesives 75 at the surface B from which the normal vector extends toward the inside of the optical pickup 7.

That is, in the present embodiment, in addition to the advantage described in the embodiment 1, it is possible to perform the application of the adhesives 75 to fix the metal plate 74 to the case 70 and the hardening by UV light irradiation through the opening 74o from one direction indicated with an arrow E in the figure, to improve the workability upon assembling.

Note that in the present embodiment, the opening 74o is provided at the root of the rising member 74d of the metal plate 74, however, when the fixing positions between the case 70 and the metal plate 74 are the surfaces A and C as the fixing positions on the metal plate 74 side and the surfaces B' and D' as the fixing positions on the case 70 side, a similar advantage can be obtained by providing the opening 74o at the root of the rising member 74b. The rising member 74b is fixed to the surface C' of the wall 70p of the case with the adhesives 75 at the surface C from which the normal vector extends toward the inside of the optical pickup 7.

[Embodiment 3]

Figure 9:
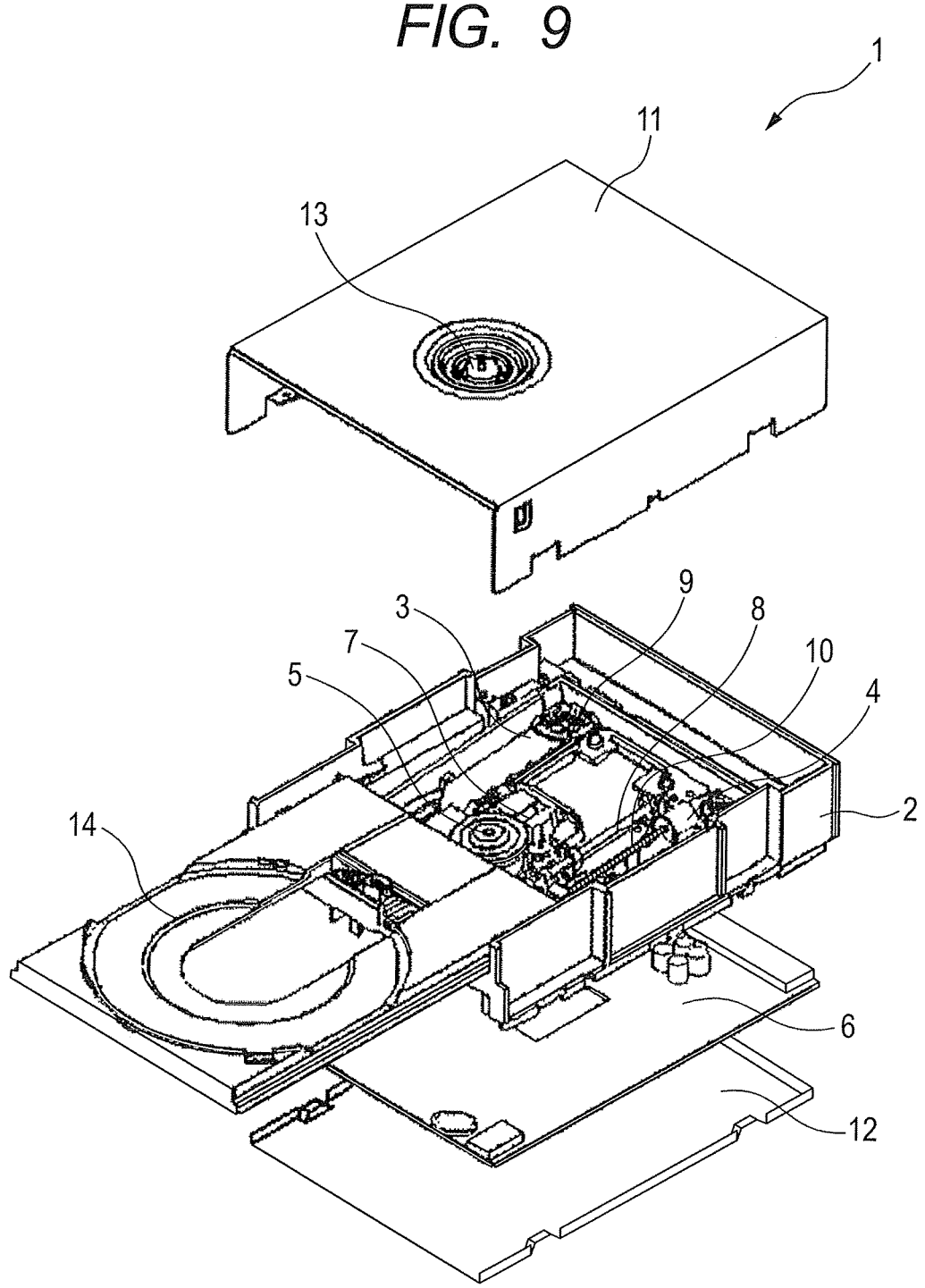
FIG. 9 is an exploded upward perspective diagram of a disc drive in which the optical pickup according to the present invention is incorporated.

FIG. 9 is an exploded perspective diagram of a disc drive 1 to which the optical pickup 7 of the present invention is applied.

In FIG. 9, the disc drive 1 mainly has a mechanical base 2, a loading mechanism to load a disc (not shown) into the drive and unload the disc to the outside of the drive, a controller 6 to drive-control the electronic part installed in the disc drive 1 and perform signal processing, a read-write mechanism to read/write information from/to the disc, and the like.

In the mechanical base 2, its upper surface and side surfaces are covered with a top cover 11 and a lower surface is covered with an under cover 12. The loading mechanism has a disc tray 14 to hold the disc when the disc is carried in into the mechanical base 2 or carried out from the mechanical base 2, a carrying-in/carrying-out mechanism to carry in the disc inside the mechanical base 2 and place the disc on a turn table of a spindle motor 5, and a vertical driving mechanism to move a unit mechanism 3 upward/downward to fix the disc placed on the turn table with a clamper 13.

The read-write mechanism has the spindle motor 5 to turn the disc, the optical pickup 7 to read/write information from/to the disc, and a feeding mechanism including a feed motor 4, a screw shaft 10 and the like to move the optical pickup 7 along guide shafts 8 and 9 in a radial direction of the disc.

As the optical pickup 7 of the present invention is applied to the disc drive 1, it is possible to realize high-speed writing to the disc and stable operation in a wide range of environmental temperature. Further, it is possible to prevent damage to the parts even upon fall of the disc drive 1 on the floor or the like, and improve the reliability.

As described above, according to the present invention, first, regarding the cooling performance for the electronic part, as the metal plate having high thermal conductivity is provided oppositely to the opening of the case and the metal plate is thermally connected with the laser diode, the cooling performance for the laser diode can be ensured even in the case of the optical pickup using a case formed of a resin material having low thermal conductivity.

Next, regarding the suppression of distortion of the case in accordance with change in environmental temperature, the present invention has the following advantage. The case and the metal plate are fixed such that the walls of the outer hull of the opening of the case at both ends in the direction between the bearings and the rising members of the metal plate are alternately opposed, and fixed using the adhesives. Further, the metal plate is formed using a material having a linear expansion coefficient within the range of the linear expansion coefficient of the case in the direction between the bearings when the fiber orientation of the case is along the direction between the bearings or random. Accordingly, even when the environmental temperature has changed, as the difference of expansion and contraction amount between the case and the metal plate is small, merely relative displacement occurs between the walls of the case and the rising members of the metal plate to go away from each other or approach each other by the expansion and contraction amount of the adhesives, and the distortion of the case can be suppressed.

Regarding the suppression of the distortion of the case due to impact load, the present invention has the following advantage. The metal plate having high elasticity is provided oppositely to the opening of the case, and the metal plate has rising members at both ends in the direction between the bearings. Further, in the direction between the bearings where the rigidity of the case is the lowest, the case and the metal plate are fixed such that the rising members of the metal plate are fixed to the walls of the outer hull of the opening of the case at both ends in the direction between the bearings. In this case, the case is distorted by the impact load in the direction between the bearings and the opening is to be widened or narrowed. On the other hand, the rising members provided at the both ends of the metal plate are to be distorted in a direction to suppress the deformation of the opening of the case.

That is, when the opening of the case is to be widened, the metal plate is distorted in a direction to contract the opening of the case, while when the opening of the case is to be contracted, the metal plate is distorted in a direction to widen the opening of the case. In this manner, the metal plate works as a reinforcing plate to suppress the deformation of the case. Accordingly, even in the optical pickup using the case formed of a resin material having low elasticity, it is possible to suppress deformation of the case and prevent dropout of parts and damage to the case.

Further, as the opening is provided at the root of the rising member of the metal plate, it is possible to perform the application of the adhesives to fix the metal plate to the case and the hardening by UV light irradiation from one direction.

Accordingly, it is possible to improve the workability upon assembling.

Accordingly, the present invention provides an optical pickup in which a cooling capability for an electronic part is ensured and distortion of a case in accordance with change in environmental temperature is suppressed, further, deformation of the case with respect to impact load is suppressed, and dropout of parts and/or damage to the case is prevented. Further, in a disc drive using the optical pickup, the present invention realizes high-speed writing to a disc and stable read/write operation, and further improves the reliability.

The invention claimed is:

1. An optical pickup, comprising:
an optical system that guides laser light emitted from a laser diode to a predetermined position of a disc;
a photo-detector that converts reflection light from the disc into an electric signal;
a case, made of a resin material, and provided with an opening for attachment of the optical system, that mounts the photo-detector and the optical system; and
a metal plate provided with two rising members bended to the case side at both ends in the direction between the bearings, that is provided to close the opening, wherein
two walls of an outer hull of the opening of the case at both ends in the direction between the bearings and the two rising members of the metal plate are alternately opposed, and the opposite walls of the case and the rising members of the metal plate are fixed respectively with adhesives.

2. An optical pickup, comprising:
an optical system that guides laser light emitted from a laser diode to a predetermined position of a disc;
a photo-detector that converts reflection light from the disc into an electric signal;
a case, made of a resin material, and provided with an opening for attachment of the optical system, that mounts the photo-detector and the optical system; and
a metal plate formed of a material having a linear expansion coefficient within a range of a linear expansion coefficient of the case in a direction between bearings, and provided with two rising members bended to the case side at both ends in the direction between the bearings, that is provided to close the opening, wherein
two walls of an outer hull of the opening of the case at both ends in the direction between the bearings and the two rising members of the metal plate are alternately opposed, and the opposite walls of the case and the rising members of the metal plate are fixed respectively with adhesives.

3. The optical pickup according to claim 2, wherein
the case is made of polyphenylene sulfide reinforced with glass fiber and/or mineral filler.

4. The optical pickup according to claim 2, wherein
the metal plate is formed of a material having a linear expansion coefficient within a range of a linear expansion coefficient of the case in the direction between the bearings when a fiber orientation of the case is along the direction between the bearings or random.

5. The optical pickup according to claim 2, wherein
in the two rising members, an opening is provided at the root of the rising member on the side fixed to the wall of the case with the adhesives in a surface from which a normal vector extends toward the inside of the optical pickup.

6. An optical pickup, comprising:
an optical system;
a photo-detector;
a case in which the photo-detector and the optical system are provided, the case being provided with bearings at both ends in the longitudinal direction of the case, provided with an opening defined by an outer hull of the case for attachment of the optical system, and made of a resin material; and
a metal plate provided to close the opening, the metal plate being provided with two rising members bended to the case side at both ends in the longitudinal direction of the case, wherein
the outside of the rising member and the inside of the outer hull are faced each other at one end in the longitudinal direction of the case, the inside of the rising member and the outside of the outer hull are faced each other at the other end, and the inside of the outer hull of the case and the outside of the rising member of the metal plate faced each other and the outside of the outer hull of the case and the inside of the rising member of the metal plate faced each other are fixed respectively with adhesives.

7. The optical pickup according to claim 6,
wherein the fiber orientation of the case is along the longitudinal direction of the case, and the metal plate is formed of austenitic stainless steel or copper alloy.

8. The optical pickup according to claim 6,
wherein the fiber orientation of the case is random, and the metal plate is formed of aluminum alloy.

9. A disc drive using the optical pickup in claim 1.

10. A disc drive using the optical pickup in claim 2.

11. A disc drive using the optical pickup in claim 3.

12. A disc drive using the optical pickup in claim 6.

* * * * *